(12) United States Patent
Inoue

(10) Patent No.: US 8,064,104 B2
(45) Date of Patent: Nov. 22, 2011

(54) FACSIMILE APPARATUS

(75) Inventor: Toyoshi Inoue, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1005 days.

(21) Appl. No.: 11/931,275

(22) Filed: Oct. 31, 2007

(65) Prior Publication Data

US 2008/0100877 A1    May 1, 2008

(30) Foreign Application Priority Data

Oct. 31, 2006 (JP) .................................. 2006-296390

(51) Int. Cl.
*H04N 1/00* (2006.01)

(52) U.S. Cl. ....... 358/400; 358/403; 358/442; 358/1.15; 379/211.01; 379/100.01; 709/238; 709/236

(58) Field of Classification Search .................. 358/400, 358/403, 442, 1.15; 379/211.01, 203, 100.01, 379/349; 709/238, 226, 217
See application file for complete search history.

(56) References Cited

U.S. PATENT DOCUMENTS

| | | | | |
|---|---|---|---|---|
| 4,941,170 A * | 7/1990 | Herbst | ..................... | 379/100.07 |
| 6,101,526 A * | 8/2000 | Mochizuki | ..................... | 709/200 |
| 6,692,167 B2 * | 2/2004 | Nakadaira et al. | .............. | 400/61 |
| 7,113,293 B2 * | 9/2006 | Mori et al. | ................... | 358/1.13 |
| 7,185,053 B1 * | 2/2007 | Mochizuki | ..................... | 709/204 |
| 2003/0030846 A1 * | 2/2003 | Mori et al. | ..................... | 358/400 |
| 2004/0179713 A1 * | 9/2004 | Tani et al. | ..................... | 382/100 |
| 2005/0086240 A1 * | 4/2005 | Richardson et al. | .......... | 707/100 |
| 2005/0154782 A1 * | 7/2005 | Yoshida | ........................ | 709/206 |
| 2010/0149570 A1 * | 6/2010 | Kamiya et al. | ............... | 358/1.13 |

FOREIGN PATENT DOCUMENTS

| | | |
|---|---|---|
| JP | 08-204935 | 8/1996 |
| JP | 11-032136 | 2/1999 |
| JP | 2002-109041 | 4/2002 |
| JP | 2004-188865 | 7/2004 |
| JP | 2007-251491 | 9/2007 |
| JP | 2008-099142 | 4/2008 |

OTHER PUBLICATIONS

Notification of Reasons of Rejection, Application No. 2006-296390 Dispatch Date Oct. 14, 2008.

* cited by examiner

*Primary Examiner* — Negussie Worku
(74) *Attorney, Agent, or Firm* — Banner & Witcoff, Ltd.

(57) ABSTRACT

A facsimile apparatus is provided with a scanning unit configured to scan a first image containing a specific image representing information related to a destination of a facsimile transmission, a setting unit configured to obtain and set the destination based on the specific image included in the first image, a generating unit configured to generate transmission data representing second image which is similar to the first image but the specific image is excluded, and a transmitting unit configured to transmit the transmission data generated by the generating unit to the destination set by the setting unit.

13 Claims, 9 Drawing Sheets

FIG. 2

| | 1411 | 1412 | 1413 | 1414 | 1415 | 1416 | 1417 | 1418 | 1419 |
|---|---|---|---|---|---|---|---|---|---|
| 1410 CODE REGISTRATION NUMBER | DECODED DATA | FIRST LAYER DISPLAY | SECOND LAYER DISPLAY | UPPER LEFT COORDINATE | UPPER RIGHT COORDINATE | LOWER LEFT COORDINATE | LOWER RIGHT COORDINATE | SAME NUMBER EXISTENCE INDICATOR | DETERMINED DESTINATION |
| 1 | QRFAX:<br>NAME1: ICHITARO INOUE<br>NAME2: ICHITARO<br>ADD: CHIKUSA-CHO CHIKUSA-KU NAGOYA-CITY ✲✲✲<br>MAIL1: OOO@brother.co.jp ✲✲✲✲✲<br>TEL1: 052-824-✲✲✲✲✲<br>FAX1: 052-825-zzzz<br>FAX2: 052-826-zzzz | ICHITARO INOUE | ①052-825-zzzz<br>②052-826-zzzz | (10,10) | (30,10) | (10,30) | (30,30) | 0 | 052-826-zzzz |
| 2 | QRFAX:<br>NAME1: NITARO INOUE<br>NAME2: NITARO<br>ADD: MINATO-CHO MINATO-KU NAGOYA-CITY ✲✲✲<br>TEL1: 052-827-✲✲✲✲✲<br>FAX1: 052-828-zzzz | NITAROU INOUE | | (210,10) | (230,10) | (210,30) | (230,30) | 0 | |
| 3 | 052-829-zzzz | INOUE CORPORATION | | (110,110) | (130,110) | (110,130) | (130,130) | 1 | |
| 4 | 052-830-zzzz | 052-830-zzzz | | (60,10) | (80,10) | (60,30) | (80,30) | 0 | |
| 5 | | | | | | | | | |

US 8,064,104 B2

FACSIMILE APPARATUS

CROSS-REFERENCE TO RELATED APPLICATION

This application claims priority under 35 U.S.C. §119 from Japanese Patent Application No. 2006-296390 filed on Oct. 31, 2006. The entire subject matter of the application is incorporated herein by reference.

BACKGROUND

1. Technical Field

The present invention relates to a facsimile apparatus, and particularly to a facsimile apparatus capable of automatically setting a destination by scanning an original sheet bearing information specifying the destination.

2. Related Art

In a field of facsimile apparatuses, there is known a technology in which a predetermined mark (a predetermined image) is printed on a document to be transmitted by the facsimile to identify a destination in a predetermined area thereon. The facsimile apparatus detects the mark, retrieves a facsimile number corresponding to the mark from a storage such as RAM (Random Access Memory), and set the facsimile number as a number of a destination of the facsimile transmission. An example of such a technology is disclosed in Japanese Patent Provisional Publication No. HEI 11-32136.

SUMMARY OF THE INVENTION

For a user at the destination (i.e., a receiver of the facsimile transmission), however, such a mark is meaningless. Only by visually recognizing such a mark, the user (receiver) can not understand information represented by the mark. Therefore, if such a mark is printed onto a received document, the receiver may feel suspiciousness.

According to one or more aspects of the invention, there is provided a facsimile apparatus that is configured to transmit images to be transmitted to a desired destination. According to other aspects of the invention, there is provided a facsimile apparatus configured to suppress transmission of information that is unnecessary for a user at the destination who views a transmitted image. According to further aspects of the invention, there is provided a facsimile apparatus configured to delete information which is included in an image for transmission and identifies a destination from the image for transmission.

According to aspects of the present invention, there is provided a facsimile apparatus which includes a scanning unit configured to scan a first image containing a specific image representing information related to a destination of a facsimile transmission, a setting unit configured to obtain and set the destination based on the specific image included in the first image, a generating unit configured to generate transmission data representing second image which is similar to the first image but the specific image is excluded, and a transmitting unit configured to transmit the transmission data generated by the generating unit to the destination set by the setting unit.

According to other aspects of the invention, there is provided a method for generating image data in a facsimile apparatus. The method includes the steps of scanning first image containing a specific image related to a destination of a facsimile transmission, obtaining the destination based on the specific image, generating transmission data representing a second image which is similar to the first image with the specific image being deleted from the first image data, and transmitting the transmission data to the destination.

According to further aspects of the invention, there is provided a computer-readable recording medium storing computer-readable instructions that cause a computer to control a facsimile apparatus. The recording medium containing instructions to scan first image containing a specific image related to a destination of a facsimile transmission, instructions to obtain the destination based on the specific image, instructions to generate transmission data representing a second image which is similar to the first image with the specific image being deleted from the first image data, and instructions to transmit the transmission data to the destination.

According to the above configuration, the specific image related to the destination, which is printed on an original document will not be transmitted to the destination.

BRIEF DESCRIPTION OF THE ACCOMPANYING DRAWINGS

FIG. 1 is a block diagram showing an electrical configuration of a multi-function peripheral (MFP) in accordance with one or more aspects of the present invention.

FIG. 2 schematically shows a configuration of a destination memory in accordance with one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, a facsimile apparatus according to aspects of the present invention will be described with reference to the accompanying drawings. The explanation of the embodiment will be given with a Multi Function Peripheral (MFP) 1, as a facsimile apparatus, which is provided with a plurality of functions such as a scanner function, copier function, and printer function as well as a facsimile function.

Figure 1:
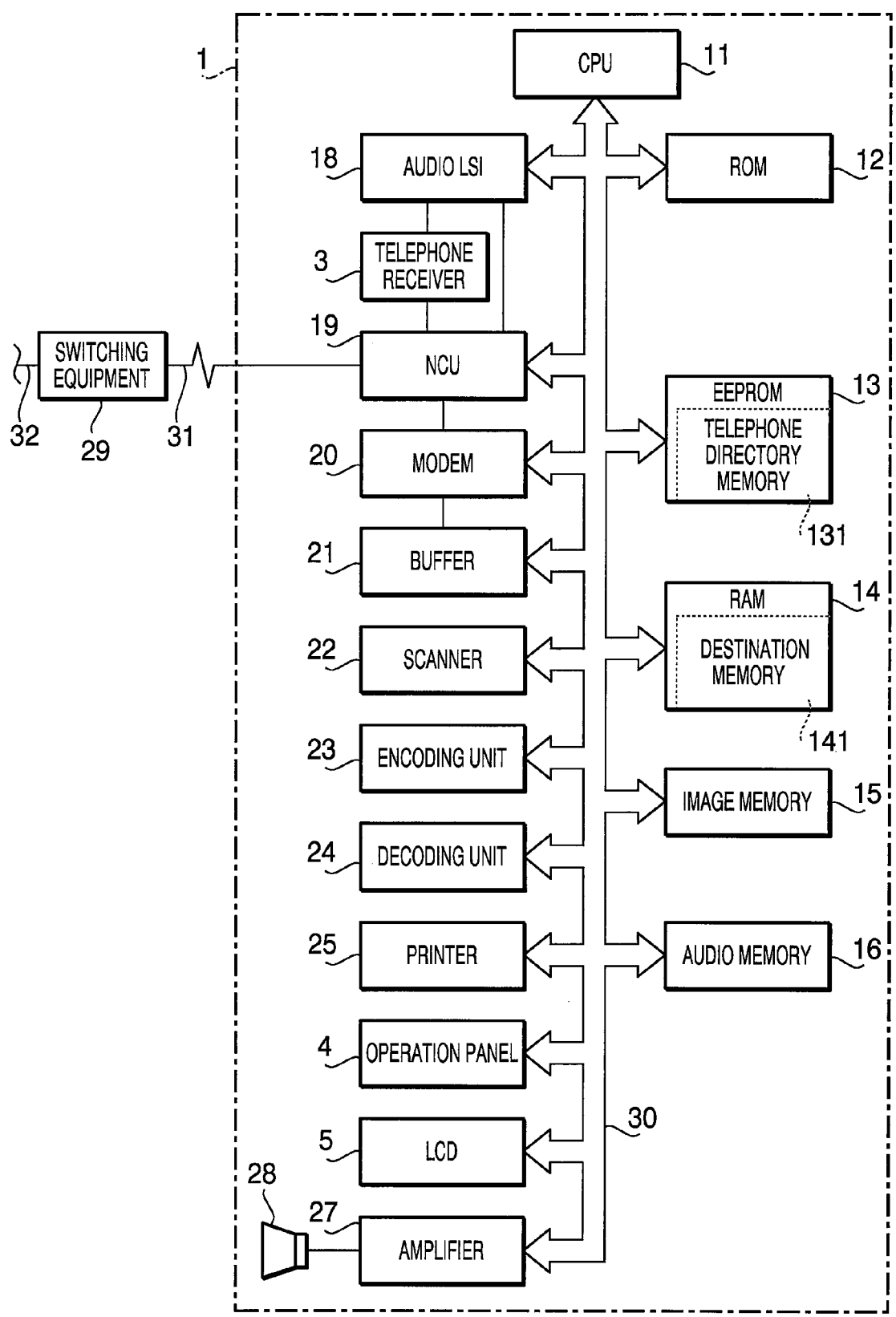

FIG. 1 is a block diagram showing an electrical configuration of the MFP 1. The MFP 1 is provided with CPU (Central Processing Unit) 11, ROM (Read Only Memory) 12, EEPROM (Electronically Erasable ROM) 13, RAM (Random Access Memory) 14, image memory 15, audio memory 16, audio LSI (Large Scale Integrated Circuit) 18, NCU (Network Control Unit) 19, modem 20, buffer 21, scanner 22, encoding unit 23, decoding unit 24, printer 25, operation panel 4, LCD (Liquid Crystal Display) 5, and amplifier 27, which are interconnected via a bus line 30.

The NCU 19 is provided for line control. The MFP 1 is connected with a telephone line 31 via the NCU 19. The NCU 19 receives various signals such as a call signal sent by a switching equipment 29 and a signal representing a phone number of a calling source (calling source number), and sends a dial signal corresponding to a key operation through the operation panel 4 to the switching equipment 29 when sending facsimile data. Further, the NCU 19 functions to transmit/receive an analog audio signal during a telephone call.

The CPU 11 controls the elements interconnected via the bus line 30 in accordance with the various signals sent and/or received via the NCU 19 and performs data communication (facsimile operation or telephone operation). The ROM 12 is a non-rewritable memory that stores control programs executed by the MFP 1. Programs represented by flowcharts shown in FIGS. 4 to 8 are stored on the ROM 12.

The EEPROM 13 is non-volatile rewritable memory. Data that have been stored into the EEPROM 13 can be held even after the MFP 1 is powered OFF. The EEPROM 13 is provided with a telephone directory memory 131 that is a memory on which a facsimile number as a destination and a name of the destination are stored in an interrelated manner. Data entry into the telephone directory memory 131 is carried out by a user.

The RAM 14 is a memory that temporarily stores various data when the MFP 1 performs various operations. The RAM 14 is provided with a destination memory 141 that is a memory storing data regarding a QR Code® included in a document scanned by the scanner 22. A configuration of the destination memory 141 will be described later with reference to FIG. 2.

The image memory 15 is configured with a dynamic RAM (DRAM), which is an inexpensive large capacity memory, to store a communication history, image data, and a bit map image for printing. Received image data are once stored in the image memory 15, and deleted therefrom after the image is printed on a recording paper by the printer 25. Image data scanned by the scanner 22 is also stored in the image memory 15.

The audio memory 16 is a memory that stores a response message to be sent to a destination device and an incoming message sent by a transmission source device. Similarly to the image memory 15, the audio memory 16 is configured with a DRAM which is an inexpensive large capacity memory.

The audio LSI 18 is configured to convert an analog audio signal received by the NCU 19 into a digital audio signal. Further, the audio LSI 18 converts a digital audio signal generated inside the MFP 1 into an analog audio signal and outputs the analog audio signal to the NCU 19 or a speaker 28 (amplifier 27). The modem 20 performs modulation and/or demodulation of image data and communication data to transmit the image data and communication data. Further, the modem 20 transmits and receives various procedure signals for transmission control. The buffer 21 temporarily stores data containing encoded image data to be sent to and received from the destination device.

The scanner 22 is configured to read out a document which is inserted into a document insertion portion (not shown) as image data, and is provided with a document feeding motor (not shown). The encoding unit 23 encodes the image data scanned by the scanner 22. The decoding unit 24 reads out image data stored on the buffer 21 or the image memory 15 and decodes the read image data. The decoded data are printed onto a recording paper by the printer 25.

The printer 25 is configured as an inkjet printer and provided with a recording paper feeding motor for feeding the recording paper, printing head for discharging ink onto the recording paper, carriage motor for moving a carriage with the printing head mounted thereon. The amplifier 27 causes the speaker 28 connected therewith to output a beep or voice.

The operation panel 4 is provided with a plurality of keys, particularly with a QR-FAX start button (QR facsimile start button). When the QR-FAX start button is pressed, image data are generated based on a document scanned by the scanner 22 and sent to a destination facsimile apparatus. At this time, when the document scanned by the scanner 22 includes a QR Code, a facsimile number is obtained by extracting and decoding the QR Code provided to the document, and the thus extracted facsimile number is set as a facsimile number of the destination facsimile apparatus. Namely, the user can automatically set the facsimile number of the destination facsimile apparatus if the QR-FAX start button is pressed and the document carries the QR Code. A process to be executed when the QR-FAX start button is pressed will be described later with reference to FIGS. 4 to 8.

Furthermore, the MFP 1 includes a telephone receiver 3 and an automatic document feeding mechanism (ADF: not shown) for automatically and continuously scanning a plurality of sheets of document placed on the ADF.

The MFP 1 configured as above is linked with the telephone line 31 via the NCU 19. The telephone line 31 is connected with the switching equipment 29 on an MFP side, and the switching equipment 29 is connected with another switching equipment via the telephone line 32. The aforementioned another switching equipment is further connected with the destination device (e.g., the destination facsimile apparatus) via another telephone line.

FIG. 2 schematically shows a data configuration of the destination memory 141. As described above, when the QR-FAX start button of the operation panel 4 is pressed, the QR Code is extracted from the document scanned by the scanner 22 and decoded. When a facsimile number is included in decoded data obtained by decoding the QR Code, QR Code information is stored in the destination memory 141. It is noted that QR Code information is stored in the destination memory 141 for each QR Code. Incidentally, it is noted that the QR Code information includes information representing a location of the QR Code and the decoded data obtained by decoding the QR Code.

As shown in FIG. 2, the destination memory 141 is provided with a code registration number area 1410, decode data area 1411 for storing the decoded data, first layer display area 1412, second layer display area 1413, upper left coordinate area 1414, upper right coordinate area 1415, lower left coordinate area 1416, lower right coordinate area 1417, same number existence indicator area 1418, and determined destination area 1419.

The code registration number area 1410 is an area in which a code registration number is stored. The code registration number is a number having a one-to-one correspondence with the QR Code information for managing the QR Code information.

The decoded data area 1411 is an area in which the decoded data obtained by decoding the QR Code are stored. The decoded data are configured with text data such as numerical characters and letters. Therefore, in the decode data, names, addresses and/or facsimile numbers can be described. By writing a predetermined tag representing attribute of each piece of data, such as "name", "address", and "facsimile number," the attribute of each decoded data can be discriminated. For example, text data with tags <NAME1>, <NAME2> written can be identified as data representing the "name." Text data with tags <FAX1>, <FAX2> written therein can be identified as data representing the "facsimile number." It is noted that there is attached to a head of the decoded data a tag representing a class of the decoded data (e.g., tag <QRFAX>). Incidentally, when the tag <QRFAX> is attached to the head of the decoded data, it is assumed that the text data with tag <NAME> and <FAX> is included in the decoded data.

The first layer display area 1412 is an area in which data to be displayed on the LCD 5 first are stored. When there are letter data with a tag <NAME> attached thereto (i.e., name data) in the decoded data, the name data with the tag <NAME> attached thereto are stored in the first layer display area 1412 (see data with code registration numbers 1 and 2 in FIG. 2).

In addition, when there is no letter data with a tag <NAME> attached thereto in the decoded data, namely, when no name data is stored in the QR Code, facsimile numbers are extracted from the decoded data and it is examined whether a facsimile number identical to the extracted facsimile number is stored in the telephone directory memory 131. Then, when the corresponding facsimile number is stored in the telephone directory memory 131, a name corresponding to the facsimile number in the telephone directory memory 131 is stored in the first layer display area 1412 (see data with code registration number 3 in FIG. 2). On the other hand, when the identical facsimile number is not stored in the telephone directory memory 131, the extracted facsimile number is stored in the first layer display area 1412 (see data with code registration number 4 in FIG. 2).

The second layer display area 1413 is an area in which, when a plurality of facsimile numbers are included in decoded data, the plurality of facsimile numbers are stored. When destination data stored in the first layer display area 1412 is selected by a user, data stored in the second layer display area 1413 is displayed on the LCD 5. Therefore, when the plurality of facsimile numbers are included in decoded data, the user can select a desired facsimile number among them.

The upper left coordinate area 1414, upper right coordinate area 1415, lower left coordinate area 1416 and lower right coordinate area 1417 are areas in which location information of the QR Code on the document is stored. When the document is read out by the scanner 22 and image data is generated, each top coordinate value in upper left, in upper right, in lower left, in lower left of the QR Code are stored in coordinate upper left area 1414, coordinate upper right area 1415, coordinate lower left area 1416 and coordinate lower right area 1417, respectively. Incidentally, each coordinate value is defined in an orthogonal coordinate system in which a predetermined point in the image data is set as an original point.

The same number existence indicator area 1418 is an area in which data indicating whether a facsimile number identical to the facsimile number included in the decoded data is stored in the telephone directory memory 131 is stored. When the identical facsimile number is stored in the telephone directory memory 131, a value "1" is stored (see data with code registration number 3 in FIG. 2), while when the identical facsimile number is not stored in the telephone directory memory 131, a value "0" is stored, for example.

The determined destination area 1419 is an area in which the facsimile number determined by the user is stored. The facsimile number stored in the determined destination area 1419 is set as the destination.

Figure 3:
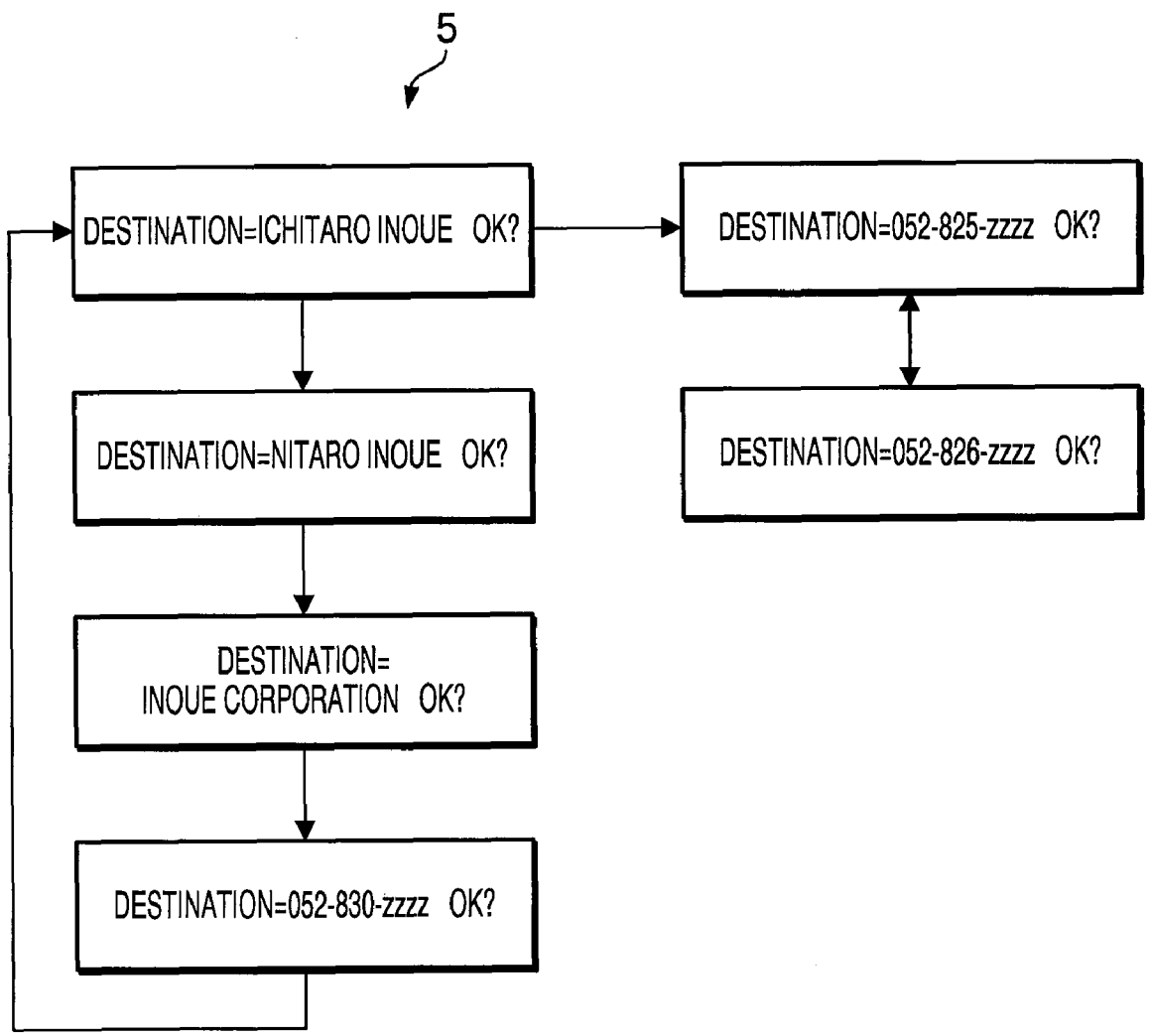
FIG. 3 shows an example of a displaying order of destination information in accordance with one or more aspects of the present invention.

Hereinafter, referring to FIG. 3, displaying order of the destination information displayed on the LCD 5 will be explained. FIG. 3 is a diagram showing the displaying order of the destination information on the LCD 5. Firstly, the data stored in the first layer display area 1412 of the destination memory 141 is displayed in order of the code registration number. Specifically, data in the first layer display area 1412 is displayed in order staring from a small code registration number to a large code registration number, by pressing an "Advance" key (not shown) on the operation panel 4. Therefore, when a plurality of pieces of decoded data is stored in the destination memory 141, that is, a plurality of QR Codes containing one or more facsimile numbers are included in one document, a user can select one destination among them. Additionally, even if data of the name is not included in the QR Code, when data of the name can be obtained form the telephone directory memory 131, the data of the name in the telephone directory memory 131 is stored in the first layer display area 1412 and displayed on the LCD 5 as described above. Therefore, the user can determine the destination easily, and the selecting operation is eased.

When any one of the data stored in the first layer display area 1412 is selected by the user, it is judged that whether any data is stored in the second layer display area 1413 corresponding to the selected data. When the data is stored in the second layer display area 1413 (see data with code registration number 1 in FIG. 2), a plurality of facsimile numbers stored in the second layer display area 1413 are displayed in order. With the above configuration, even if a plurality of facsimile numbers are included in the data decoded from one QR Code, the user can select a desired facsimile number among the plurality of facsimile numbers.

Figure 4:
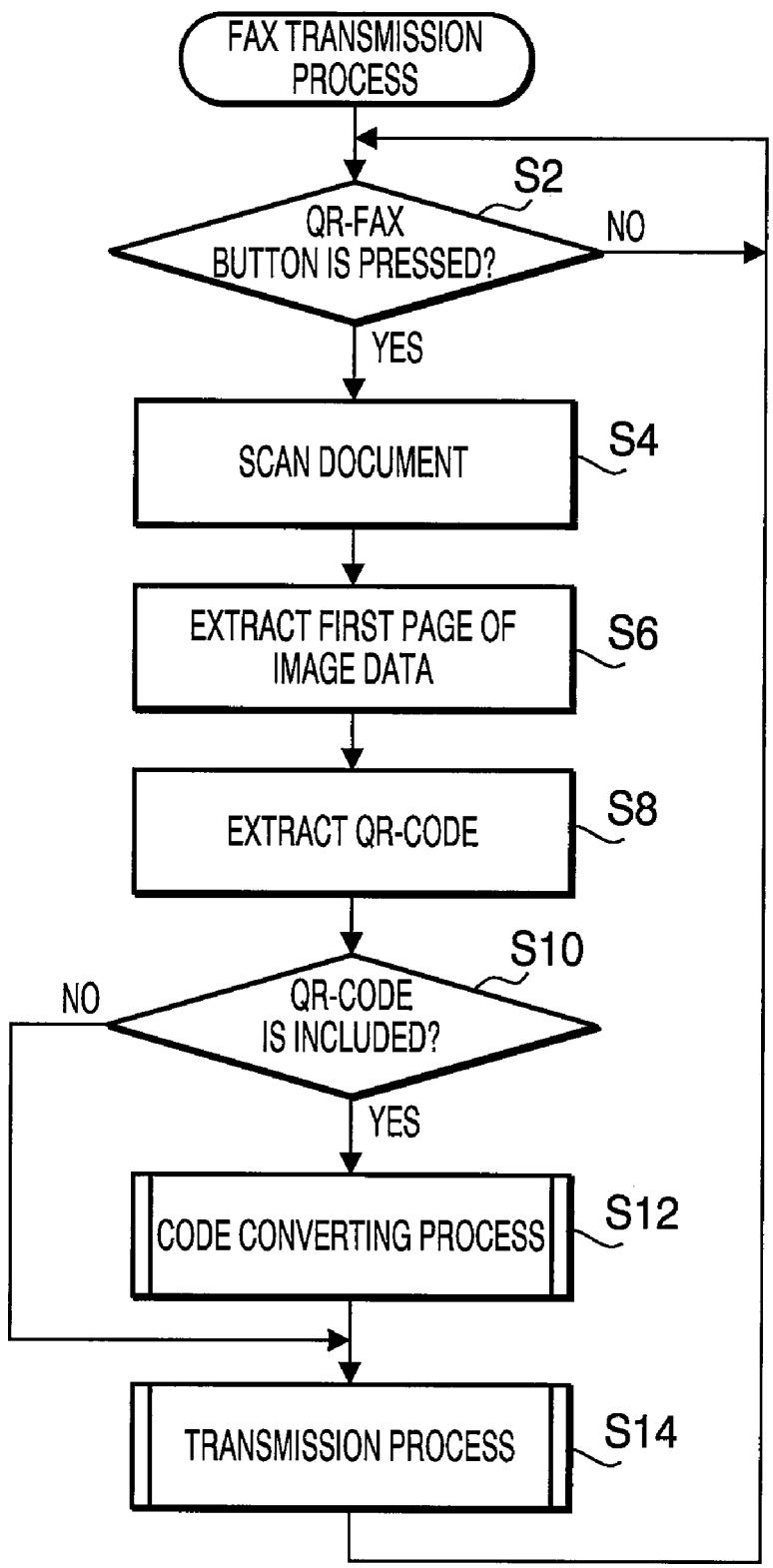
FIG. 4 is a flowchart showing a facsimile transmission process.

Referring now to flowcharts in FIGS. 4 to 8, processes executed by the CPU 11 of the MFP 1 configured as above will be described. FIG. 4 is a flowchart showing a facsimile transmission process. The facsimile transmission process is initiated by applying the power to the MFP 1. Firstly, the CPU 11 judges whether the QR-FAX start button on the operation panel 4 is pressed (S2).

When the QR-FAX start button is not pressed (S2: NO), the CPU 11 waits until a next operation is made. On the other hand, when the QR-FAX start button is pressed (S2: YES), the CPU 11 advances to a process in S4.

Figure 9A:
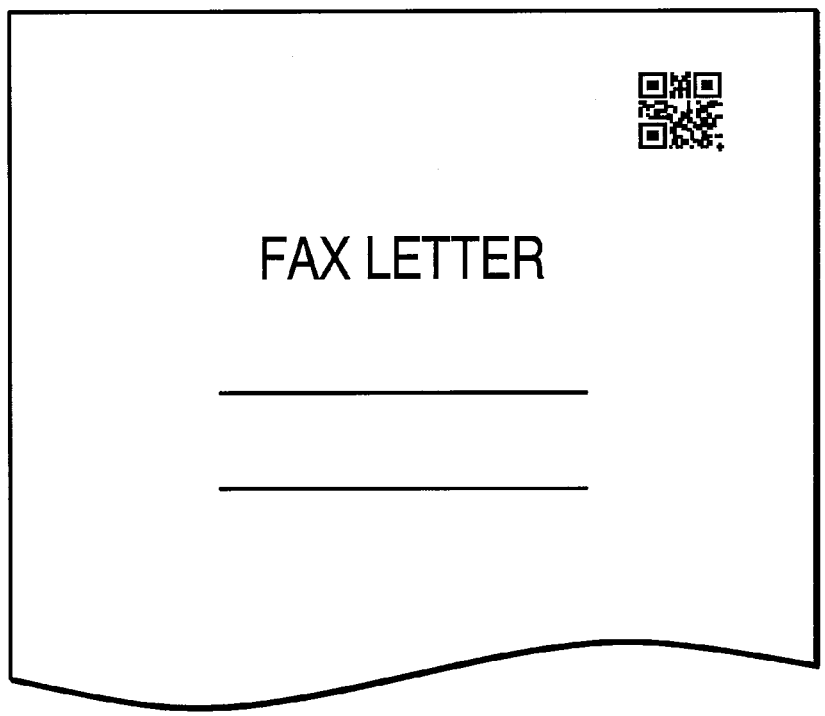
FIG. 9A shows an example of an original document to be transmitted by a facsimile transmission process.

Next, a document is read out by the scanner 22 (S4). The document includes a QR Code on a predetermined location in upper right of the document, as shown in FIG. 9A, for example. Then, image data is generated by the scanner 22 based on the document, and stored in the image memory 15. Next, image data on a first page of the document is extracted (S6) and the QR Code is extracted from the extracted image data (S8). Incidentally, although the QR Code is extracted only from the image data of the first page in the present embodiment on the ground that a QR Code specifying a destination is generally attached to the first page, the QR Code may be extracted from the image data of all pages.

Next, the CPU 11 judges whether the QR Code is included in the image data (S10). When the QR Code is not included (S10: NO), the CPU skips a process in S12. On the other hand, when the QR Code is included (S10: YES), the CPU 11 advances to a code converting process in S12 for decoding the QR Code. The code converting process (S12) will be described later with reference to FIG. 5.

Next, the CPU 11 executes a transmission process (S14). In the transmission process, a facsimile number of a destination is set and the image data is transmitted to a facsimile device of the facsimile number of the destination. Then, a transmission operation for one document is completed. Incidentally, the transmission process will be described later with reference to FIG. 7. After the transmission process, the CPU 11 returns to the process in S2 and waits until the QR-FAX button is pressed.

Figure 5:
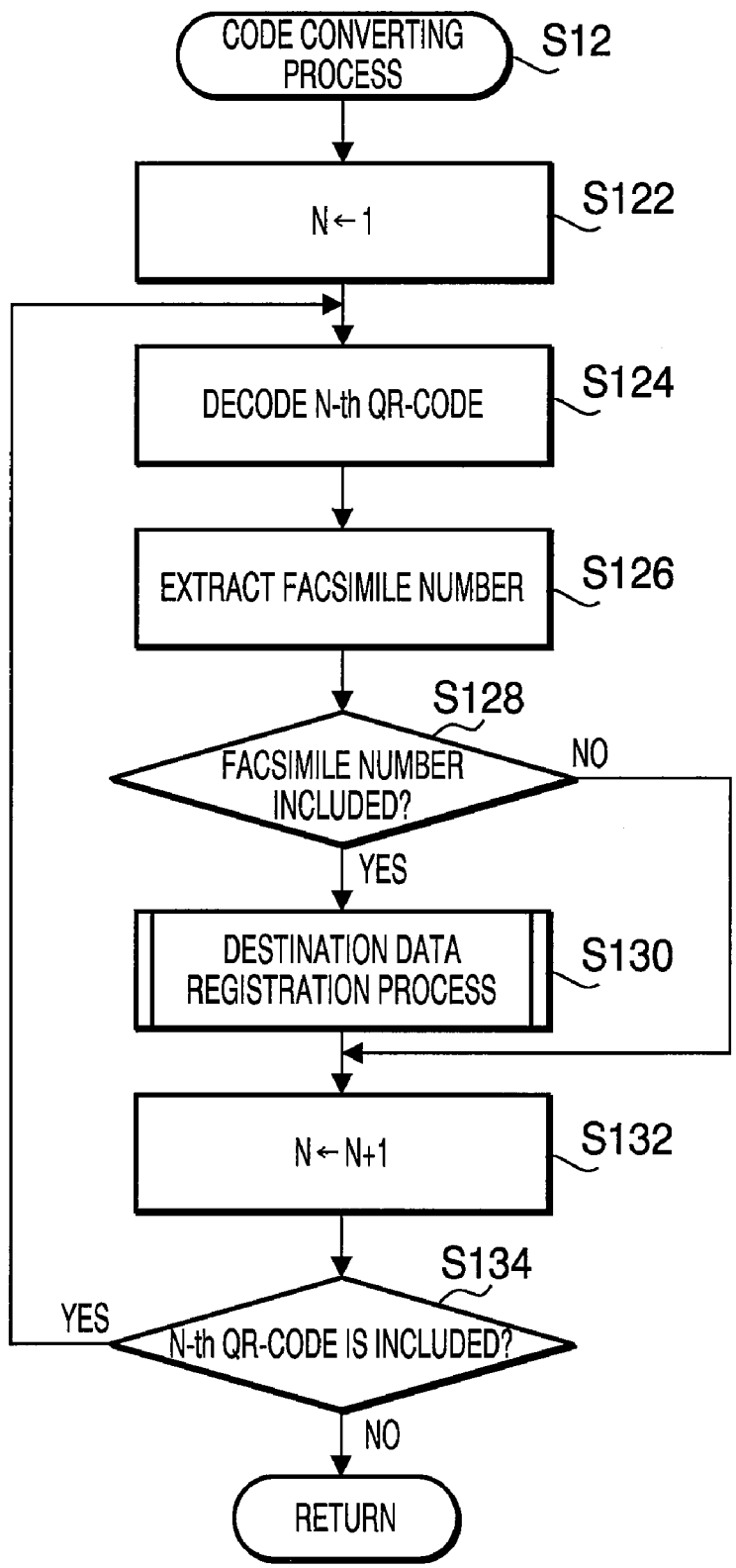
FIG. 5 is a flowchart showing a decoding process.

FIG. 5 is a flowchart showing the code converting process (S12). The code converting process is executed when the QR Code is included in the document of the first page.

Firstly, a parameter N is set to "1" (S122). Next, the Nth QR Code is decoded (S124). Then, a facsimile number is extracted from decoded data of the Nth QR Code. Incidentally, a numeric string with a predetermined digit number is extracted as a facsimile number.

Next, the CPU judges whether the facsimile number is included in the decoded data (S128). When the facsimile number is included in the decoded data (S128: YES), the CPU 11 executes a destination data registration process (S130), in which the facsimile data is stored in the destination memory 141. Incidentally, the destination data registration process will be described later with reference to FIG. 6. On the other hand, when the facsimile number is not included in the decoded data (S128: NO), the CPU 11 skips the process in S130. That is, when the QR Code does not include a facsimile number, decoded data of such QR Code is not stored in the destination memory 141.

Next, the parameter N is incremented by "1" (S132), and the CPU 11 judges whether the Nth QR Code is included in the image data (S134). When the Nth QR Code is included (S134: YES), the CPU 11 returns to S124 and repeats the processes thereafter. On the other hand, when the Nth QR Code is not included (S134: NO), the code converting process is terminated. With the code converting process as described above, all QR Codes included in the first page of the document is decoded and the decoded data including a facsimile number is stored in the destination memory 141.

Figure 6:
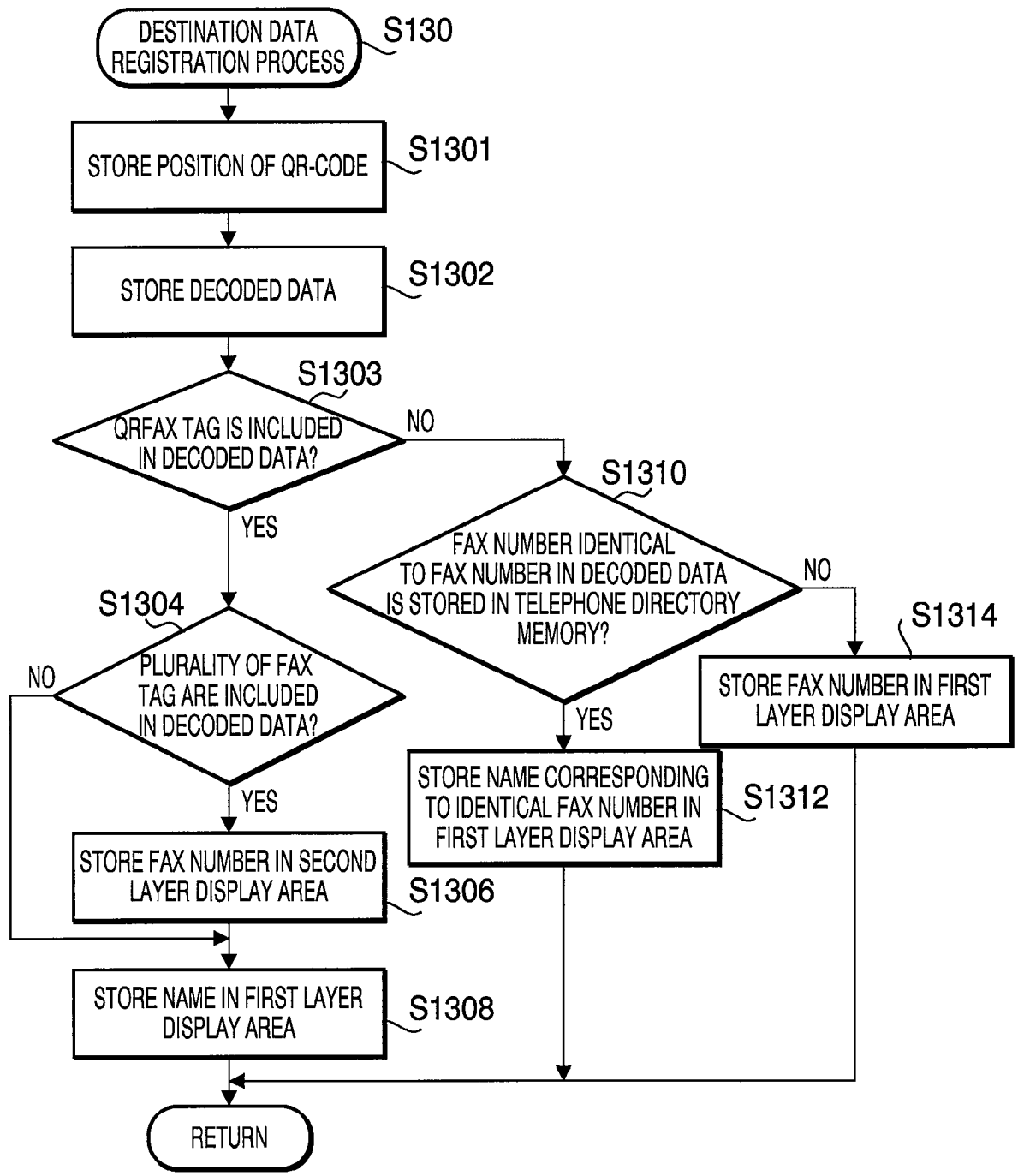
FIG. 6 is a flowchart showing a destination data registration process.

FIG. 6 is a flowchart showing the destination data registration process (S130). The destination data registration process is executed when one or more facsimile number is included in the decoded data of the QR Code.

Firstly, each coordinate values indicating a location of the QR Code is stored in the upper left coordinate area 1414, upper right coordinate area 1415, lower left coordinate area 1416 and lower right coordinate area 1417, respectively (S1301), and the decoded data of the QR Code is stored in the decoded data area 1411 (S302).

Next, the CPU judges whether a <QRFAX> tag is attached to a head of the decoded data (S1303). When the <QRFAX> tag is attached (S1303: YES), the CPU further judges whether a plurality of <FAX> tags for identifying facsimile numbers in the decoded data are attached (S1304). When the plurality of <FAX> tags are attached (S1304: YES), data indicating the facsimile numbers identified by the tags are extracted from the decoded data and stored in the second layer display area 1413 (S1306). On the other hand, only one <FAX> tag is attached (S1304: NO), the CPU skips the process in S1306 and advances to a process in S1308.

Next, data indicating a name identified in a <NAME> tag is extracted from the decoded data and stored in the first layer display area 1412 (S1308). Then the destination data registration process is terminated.

On the other hand, when the <QRFAX> tag is not attached to the head of the decoded data (S1303: NO), the CPU 11 judges whether a facsimile number identical to the facsimile number included in the decoded data is stored in the telephone directory memory 131 (S1310). When the identical facsimile number is stored in the telephone directory memory 131 (S1310: YES), a name corresponding to the identical facsimile number in the telephone directory memory 131 is stored in the first layer display area 1412 (S1312) and the destination data registration process is terminated. That is, even when data indicating a name is not included in the decoded data, a name corresponding to the facsimile number can be obtained from the telephone directory memory 131 and stored in the first layer display area 1412.

However, the identical facsimile number is not stored in the telephone directory memory 131 (S1310: NO), the facsimile number included in the decoded data is stored in the first layer display area 1412 (S1314) and the destination data registration process is terminated.

With the destination data registration process, when a name corresponding to a facsimile number is obtained, the name is stored in the first layer display area 1412, and when a name corresponding to a facsimile number is not obtained, the facsimile number is stored in the first layer display area 1412. Additionally, when the CPU 11 judges that a plurality of facsimile numbers are included in the decoded data based on the number of <FAX> tag, the plurality of facsimile numbers are stored in the second layer display area 1413.

Figure 7:
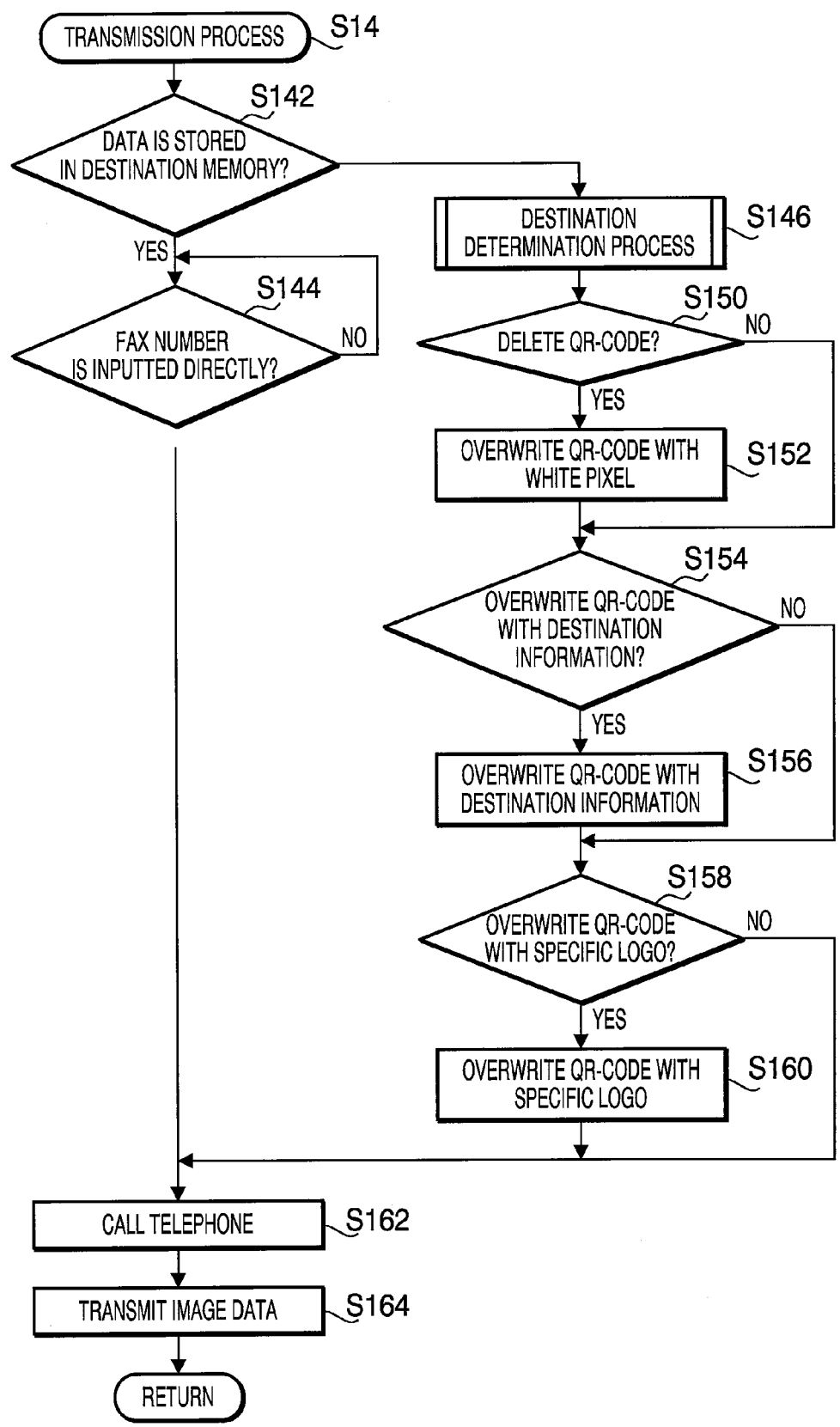
FIG. 7 is a flowchart showing a transmission process.

FIG. 7 is a flowchart showing a transmission process (S14). In the transmission process, the CPU 11 firstly judges whether any data is stored in the destination memory 141 (S142). When no data is stored in the destination memory 141 (i.e. when a QR Code containing a facsimile number is not included in the image data) (S142: NO), the CPU 11 waits until a facsimile number is directly entered on the operation panel 4 by a user (S144). Then the facsimile number is entered by the user on the operation panel 4 (S144: YES), the CPU 11 interfaces with the telephone line and calls a destination facsimile apparatus of the entered facsimile number (S162). When the telephone line is connected with the called facsimile apparatus, the CPU 11 transmits the image data in the image memory 15 to the destination facsimile apparatus (S164).

On the other hand, when the data is stored in the destination memory 141, the CPU executes a destination determination process (S146) in which at least one facsimile number is selected by a user among the facsimile numbers stored in the destination memory 141. The destination determination process is described later with reference to FIG. 8.

Next, the CPU 11 inquires of the user whether to delete the QR Code (S150). When the user selects to delete the QR Code (S150: YES), the QR Code corresponding to the destination determined in S146 in the image data is overwritten with white pixel (S152) and the CPU 11 advances to a process in S154. Specifically, image data, in which image data representing the QR Code corresponding to the facsimile number determined as a destination is deleted from the image data originally read out by the scanner 22 from the document, is generated. Incidentally, the location of the QR Code is specified based on the data stored in the upper left coordinate area 1414, upper right coordinate area 1415, lower left coordinate area 1416 and lower right coordinate area 1417. On the other hand, when the user does not select to delete the QR Code (S150: NO), the CPU 11 skips the process in S152.

Next, the CPU 11 inquires of the user whether to overwrite an area in which the QR Code corresponding to the destination determined in S146 is deleted (herein after referred to as a "deleted area") with destination information (S154). When the user selects to overwrite the deleted area with the destination information (S154: YES), the destination information is overwritten on the deleted area (S156), and the CPU 11 advances to a process in S158. That is, the image data in which the QR Code corresponding to the facsimile number determined as the destination is deleted from the original image data read from the document by the scanner 22, and the destination information is added to an area in which the QR Code is deleted, is generated. Incidentally, the destination information includes a facsimile number of the determined destination or the name of the destination obtained from the decoded data, for example. Additionally, when the user does not select to overwrite the deleted area with the destination information (S154: NO), the CPU 11 skips the process in S156.

Next, the CPU 11 inquires of the user whether to overwrite the deleted area with a specific logo (S158). When the user selects to overwrite the deleted area with the specific logo (S158: YES), the specific logo is overwritten on the deleted area (S160), and the CPU 11 advances to a process in S162. That is, the image data, in which the QR Code corresponding to the facsimile number determined as the destination is deleted from the original image data read from the document by the scanner 22, and a specific logo is added to an area in which the QR Code is deleted, is generated. Additionally, when the user does not select to overwrite the deleted area with the specific logo (S158: NO), the CPU 11 skips the process in S160.

Figure 9B:
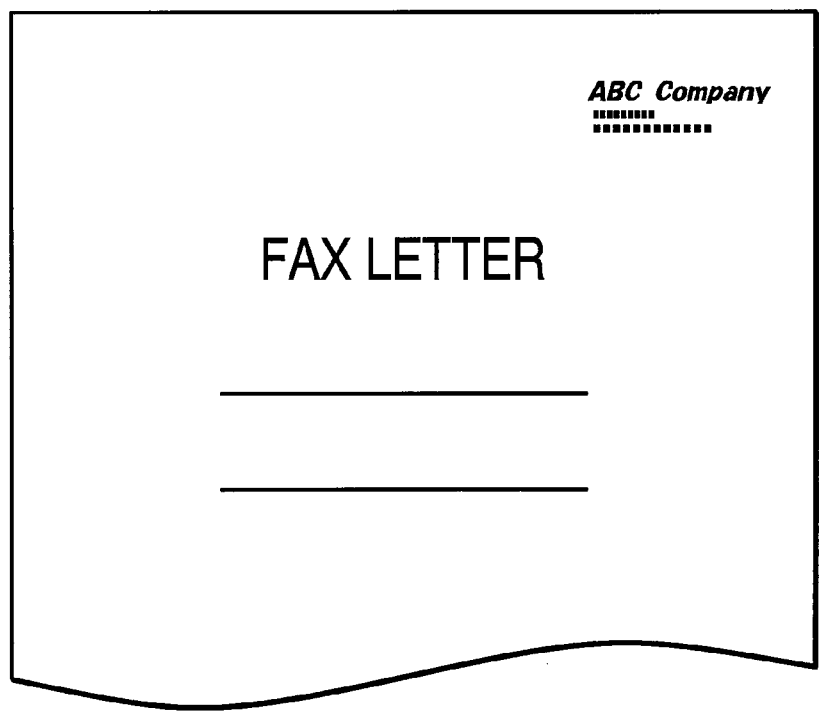
FIG. 9B shows an example of image data generated in the facsimile transmission process.

Then, the CPU 11 interfaces with the telephone line and calls a destination facsimile device of the facsimile number determined by the destination determination process (S146). When the telephone line is connected with the called facsimile device, the CPU 11 transmits the image data in the image memory 15 to the destination facsimile device (S164). When the user selects to delete the QR Code or to add the transmission information or the specific logo, the image data in which the QR Code is deleted or the transmission information or the specific logo is added, is stored in the image memory 15, so that the destination facsimile device could receive the image data without the QR Code or with the transmission information or the specific logo. FIG. 9B shows an example of image data in which the QR Code is deleted from the document in FIG. 9A and the specific logo is added to the deleted area. The specific logo is stored in the EEPROM 13 in advance. As shown in FIG. 9B, when the transmission information or the specific logo is added to the area in which the QR Code is deleted, a layout of the document is better than the case when the area, in which the QR Code is deleted, is remained in blank. Therefore, a person who has received a transmitted document does not mistrust the document.

Figure 8:
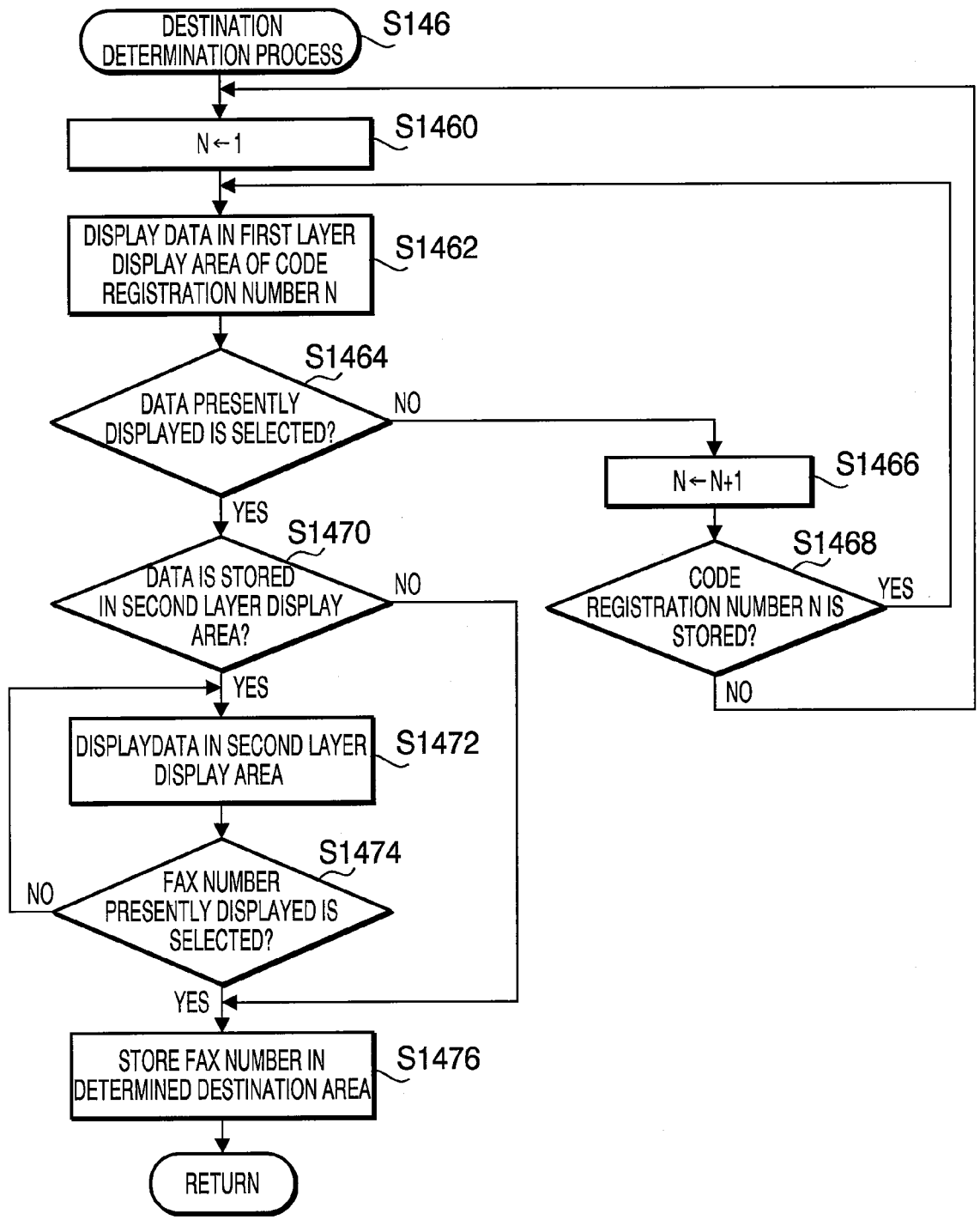
FIG. 8 is a flowchart showing a destination determining process.

FIG. 8 is a flowchart showing the destination determination process (S146). In the destination determination process, a facsimile number to be a destination is determined based on the data stored in the destination memory 141.

Firstly, a parameter N is set to "1" (S1460). Then, data stored in the first layer display area 1412 of the code registration number N is displayed on the LCD5 (S1462).

The data presently displayed on the LCD 5 is selected by pressing an "Enter" key (not shown) on the operation panel 4 by a user. Additionally, when a key other than the "Enter" key is pressed (S1464: NO), the parameter N is incremented by "1" (S1466). Then, the CPU 11 judges whether data of a code registration number N is stored in the destination memory 141 (S1468). When data of the code registration number N is stored (S1468: YES), the CPU returns to the process in S1462, and data stored in the first layer display area 1412 of the code registration number N is displayed (S1462). When data of the code registration number N is not stored (S1468: NO), the CPU 11 returns to the process in S1460, the parameter N is reset to "1", and data stored in the first layer display area 1412 of the code registration number 1 is displayed.

During the data stored in the first layer display area 1412 is displayed in order of code registration numbers, when the data presently displayed on the LCD 5 is selected by pressing the "Enter" key on the operation panel 4 by the user (S1464: YES), the CPU 11 judges whether data is stored in the second layer display area 1413 of the code registration number N (S1470). When the data is not stored in the second layer display area 1413 (S1470: NO), the CPU 11 skips processes in S1472 and S1474. Then, a facsimile number included in the decoded data of the code registration number N is stored in the determined destination area 1419 and the destination determination process is terminated.

On the other hand, when the data is stored in the second layer display area 1413 (S1470: YES), one of facsimile numbers stored in the second layer display area 1413 is displayed on the LCD 5 (S1472). Then, the CPU judges whether the facsimile number presently displayed on the LCD 5 is selected by pressing the "Enter" key on the operation panel 4 by a user (S1474).

When the facsimile number presently displayed on the LCD 5 is not selected, that is, a key other than the "Enter" key is pressed by the user (S1474: NO), a next facsimile number stored in the second layer display area 1413 is displayed on the LCD5 (S1472).

During the facsimile number stored in the second layer display area 1413 is displayed in order, when the facsimile number presently displayed on the LCD 5 is selected, the facsimile number is stored in the determined destination area 1419 (S1476) and the destination determination process is terminated.

With the destination determination process described above, a desired facsimile number among the facsimile numbers stored in the second layer display area 1413 is selected by the user, and stored in the determined destination area 1419 so as to be set in the transmission process.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

For example, while specific information specifying a destination is included in a QR Code in the present embodiment, the specific information is not limited to be included in the QR Code and may be included in other mark, such as other kinds of two dimension code or a bar-code, etc.

Additionally, while destination information and a specific logo is overwritten on an area in which the QR Code is deleted, the destination information and the specific logo may be added to an appropriate position in consideration of a layout of the document to be transmitted.

Further, while a QR Code is extracted when the facsimile transmission process is started by pressing a QR-FAX button, it may be configured to judge whether the QR Code is included in the document as every facsimile transmission process and when the QR Code is included, transmit the image data to the destination specified by the QR Code. In this case, the destination determination process is preferably configured to display not only a destination stored in the destination memory but also destinations read out from telephone directory memory or designated on the operation panel, so as to be selectable by a user, so that the image data can be transmitted to a destination other than the destination specified by the QR Code.

In the exemplary embodiment, cases where a destination is represented by a facsimile number. It should be noted that a so-called internet facsimile system using the Internet is also used, and the present invention is applicable to facsimile apparatuses complying with such a system. In this case, an email address is used to represent the destination. That is, email addresses in the internet facsimile system correspond to the facsimile numbers (phone numbers) of the conventional facsimile system.

What is claimed is:

1. A facsimile apparatus comprising:
  a scanning unit configured to scan a first image, the first image containing a specific image;
  a storing unit configured to store computer-executable instructions;
  a processor configured to execute the computer-executable instructions to provide functional units including:
    a setting unit configured to obtain, from the specific image, destination information related to a destination of a facsimile transmission and to set a destination of the facsimile transmission based on the destination information obtained from the specific image; and
    a generating unit configured to generate transmission data representing a second image composed of the first image without the specific image; and
  a transmitting unit configured to transmit the transmission data generated by the generating unit to the destination set by the setting unit,
  wherein the generating unit generates the transmission data by replacing the specific image with a predetermined image.

2. The facsimile apparatus according to claim 1, further comprising:
  a display unit configured to display the destination information related to the specific image; and
  a selection unit configured to allow a user to select one of destinations corresponding to the destination information displayed by the display unit.

3. The facsimile apparatus according to claim 2,
  wherein, when a plurality of specific images are contained in the first image, and
  wherein the generating unit generates the transmission data such that the specific image corresponding to the destination selected by the user is deleted among the plurality of specific images contained in the first image.

4. The facsimile apparatus according to claim 3,
  wherein the specific image to be deleted is only the specific image corresponding to the one of the destinations selected by the user.

5. The facsimile apparatus according to claim 2,
  wherein, when the specific image includes a plurality of pieces of destination information respectively corresponding to a plurality of destinations, the display unit displays the plurality of pieces of information respectively corresponding to the plurality of destinations, and
  wherein the selection unit allows the user to select one of the plurality of pieces of information displayed by the display unit.

6. The facsimile apparatus according to claim 2,
  wherein the destination identified by the specific information included in the first image scanned by the scanning unit includes a facsimile number.

7. The facsimile apparatus according to claim 6,
  wherein the storing unit is configured to store the facsimile number of a destination and a name of the destination in a related manner,
  wherein, the display unit displays the name of the destination corresponding to the facsimile number of the destination when a facsimile number corresponding to the destination related to the specific image is identical to the facsimile number of the destination stored in the storing unit.

8. The facsimile apparatus according to claim 1,
  wherein, the predetermined image is an image indicating the destination information.

9. The facsimile apparatus according to claim 1,
  wherein, the predetermined image is an image of a specific logo.

10. The facsimile apparatus according to claim 1,
  wherein the storing unit is configured to store information represented by the specific image included in the first image,
  wherein the information represented by the specific image being stored in the storing unit in a classified manner in accordance with a predetermined classification.

11. The facsimile apparatus according to claim 1,
  further comprising an operation unit configured to allow a user to input an instruction,
  wherein, the setting unit sets the destination based on the instruction inputted by the user when the specific image is not contained in the first image.

12. A method for generating image data in a facsimile apparatus including the steps of:
  scanning a first image containing a specific image;
  obtaining destination information from the specific image;
  generating transmission data representing a second image composed of the first image without the specific image; and
  transmitting the transmission data to a destination corresponding to the destination information,
  wherein the generating transmission data replaces the specific image with a predetermined image.

13. A computer-readable recording medium storing computer-readable instructions that cause a computer to control a facsimile apparatus, the computer-readable instructions comprising:
  instructions to scan a first image containing a specific image;
  instructions to obtain destination information from the specific image;
  instructions to generate transmission data representing a second image composed of the first image without the specific image; and
  instructions to transmit the transmission data a destination corresponding to the destination information,
  wherein the instructions to generate the transmission data include instructions to replace the specific image with a predetermined image.

* * * * *